Dec. 8, 1953 G. R. STIBITZ 2,662,148

GANGED CIRCUIT ELEMENT

Filed Jan. 6, 1953 6 Sheets-Sheet 1

INVENTOR
George R. Stibitz

BY Harold T. Stowell

ATTORNEY

Dec. 8, 1953

G. R. STIBITZ 2,662,148

GANGED CIRCUIT ELEMENT

Filed Jan. 6, 1953

6 Sheets-Sheet 2

INVENTOR
George R. Stibitz

BY Harold T. Stowell

ATTORNEY

Dec. 8, 1953 G. R. STIBITZ 2,662,148

GANGED CIRCUIT ELEMENT

Filed Jan. 6, 1953 6 Sheets-Sheet 3

INVENTOR
George R. Stibitz

BY Harold T. Stowell
ATTORNEY

Dec. 8, 1953

G. R. STIBITZ 2,662,148

GANGED CIRCUIT ELEMENT

Filed Jan. 6, 1953

6 Sheets-Sheet 4

INVENTOR
George R. Stibitz

BY Harold T. Stowell

ATTORNEY

Dec. 8, 1953

G. R. STIBITZ 2,662,148

GANGED CIRCUIT ELEMENT

Filed Jan. 6, 1953

6 Sheets-Sheet 5

INVENTOR
George R. Stibitz

BY Harold T. Stowell

ATTORNEY

Dec. 8, 1953 G. R. STIBITZ 2,662,148

GANGED CIRCUIT ELEMENT

Filed Jan. 6, 1953 6 Sheets-Sheet 6

INVENTOR
George R. Stibitz

BY Harold T. Stowell

ATTORNEY

Patented Dec. 8, 1953

2,662,148

UNITED STATES PATENT OFFICE 2,662,148

GANGED CIRCUIT ELEMENT

George R. Stibitz, Burlington, Vt.

Application January 6, 1953, Serial No. 329,779

19 Claims. (Cl. 201—48)

This invention relates to ganged elements for electrical circuits, and more particularly to a method and means for enabling the expeditious and economical production of electrical devices involving a large number of similar but separate electric circuits. An electric organ is an example of such a device, since it has a great many similar electrical paths, and the duplication of simple circuit elements in such an organization is a major item of expense in the construction thereof. I shall therefore describe my invention in connection with the elements of an electric organ, although it will be apparent that the invention is not limited thereto, but could find many other applications in the electrical field, for example, in the communications field where many circuits must be duplicated and closely spaced, etc. In all such applications, making up cable and wiring terminals is very expensive, because wires are handled, skinned, inserted into lugs and soldered individually.

It is a primary object of my invention to obviate the above disadvantages and to greatly reduce the expense of multiple circuit construction as well as greatly speed up the construction and installation of such circuits. This I accomplish by the use of ganged cables, ganged circuit elements and ganged terminals, all using the same spacing between conductors, so that cables can be skinned, put into place and clamped as a whole. According to my invention I also propose to facilitate and reduce the expense of construction of circuit elements for multiple use by constructing such elements in gangs substantially simultaneously. According to my invention, a large number of circuit elements, such as switches, rheostats, potentiometers, terminal connectors, etc., are constructed at once in groups or gangs. It is a feature of the invention that these circuit elements are made with the same spacing as the predetermined spacing of the separate wires of the ganged cables, whereby whole groups of circuits can be assembled simultaneously, including all necessary circuit and control elements.

Another object of my invention is the provision of exceedingly simple and efficient small circuit elements suitable for but not restricted to gang construction, such elements including switches, terminal connectors, rheostats, etc.

The specific nature of the invention, as well as other objects and advantages thereof, will clearly appear from a description of a preferred embodiment as shown in the accompanying drawings in which.

Figures 17, 17A:
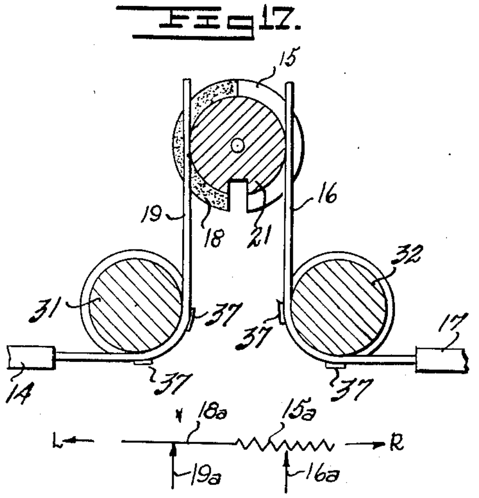
Fig. 17 is a sectional view showing a ganged resistor produced from the elements previously described.
Figure 18:
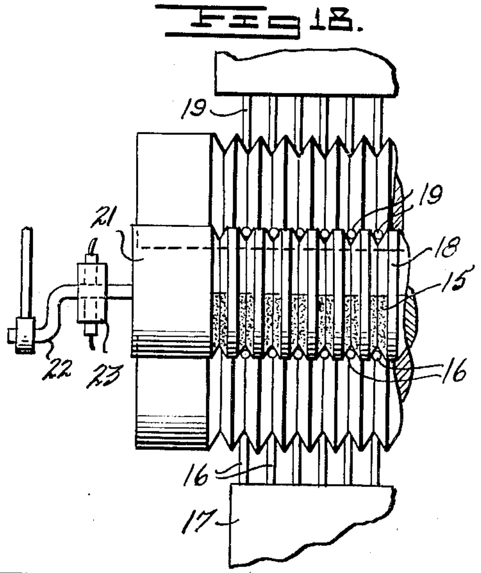
Figure 19:
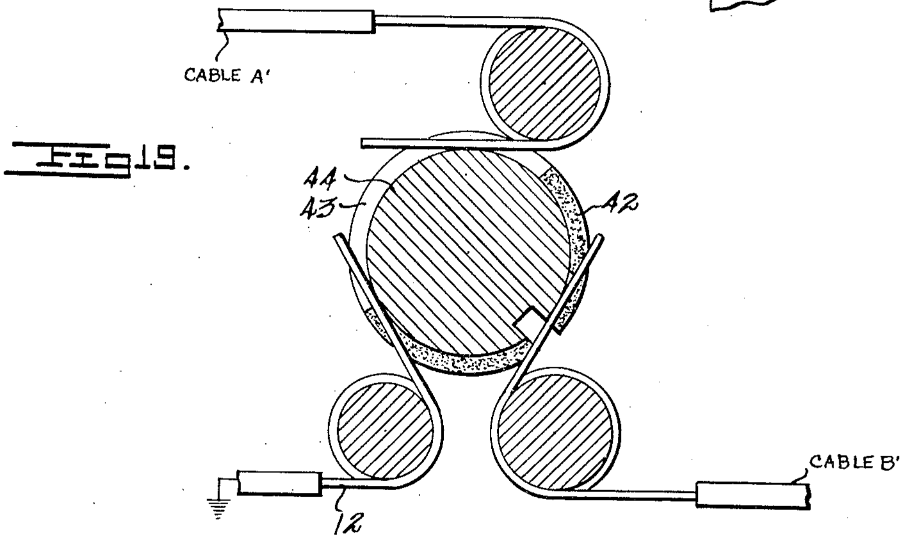
Figure 20:
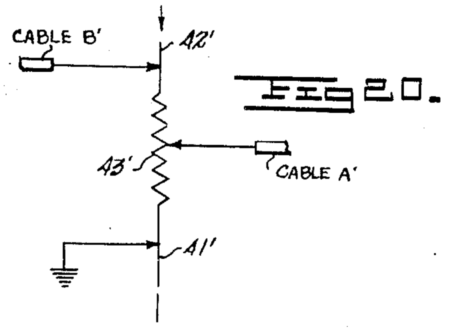
Figure 21:
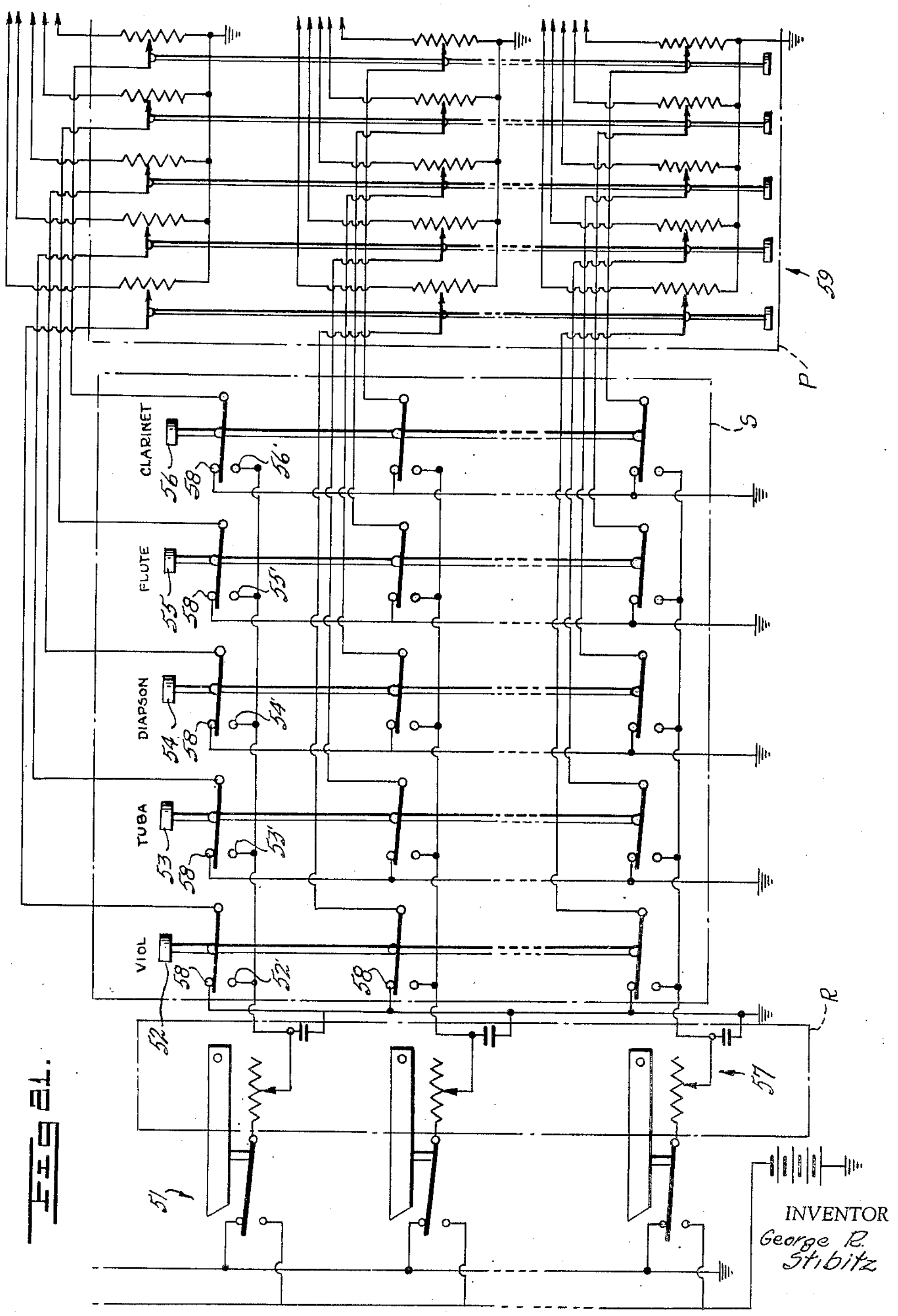
Figure 22:
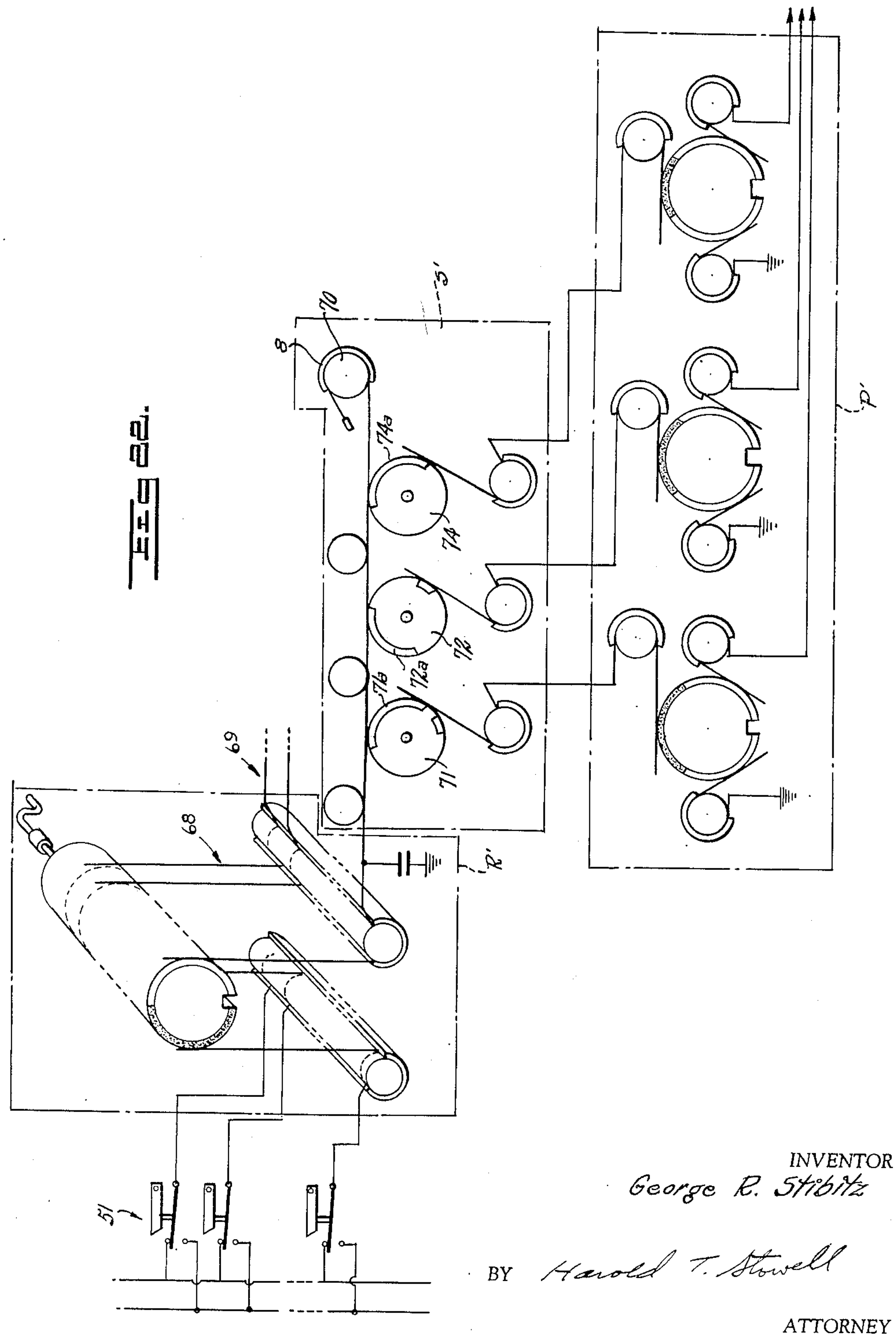

Fig. 17*a* shows the electric circuit equivalent of Fig. 17;

Fig. 18 is a top view of Fig. 17;

Fig. 19 is a sectional view showing the construction of a ganged potentiometer;

Fig. 20 is an electric circuit equivalent to Fig. 19;

Fig. 21 shows a hypothetical circuit diagram for three keys of an electric organ, using conventional circuit elements; and Fig. 22 shows an organ having the same electric circuit as Fig. 21, but using my improved ganged circuit components.

Figures 1, 2, 3:
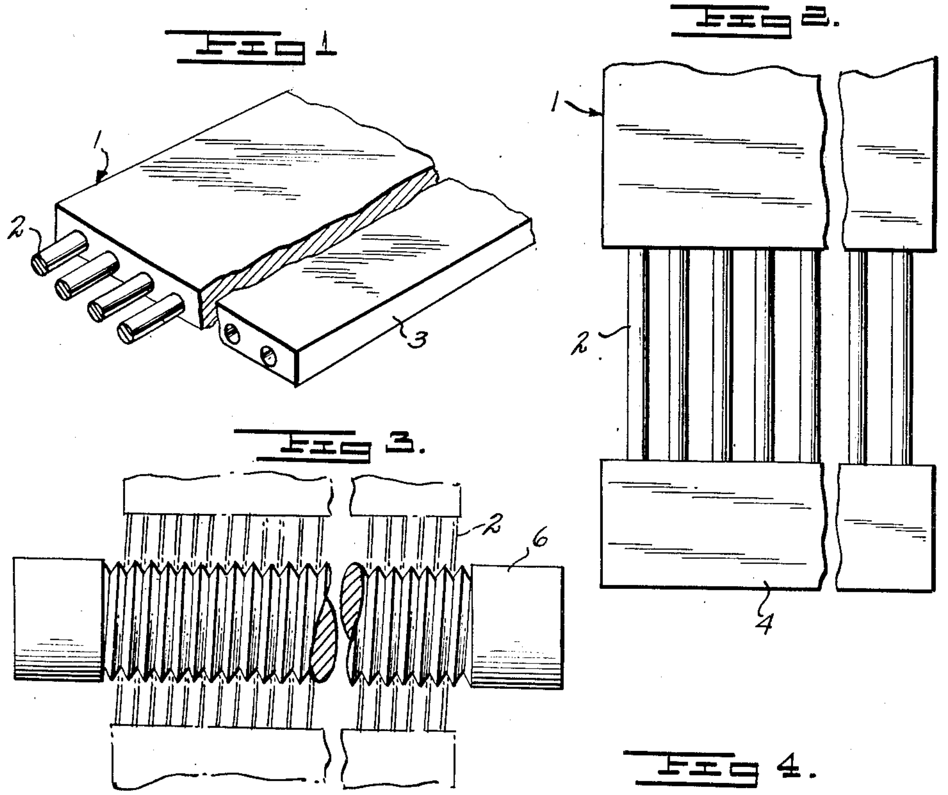
Fig. 1 is a perspective view of a ganged insulated cable used in my invention.
Fig. 2 is a plan view of the cable of Fig. 1, showing the method of stripping it.
Fig. 3 is a schematic view of a ganged cable and insulating spacer.

A basic element of my invention resides in the cooperation of all of the circuit elements with a multiple cable constructed as shown in Fig. 1.

Each cable is in the form of a relatively broad ribbon 1, in which a suitable number of wires 2, are laid side by side and held in place by a plastic binder 3. Alternatively, the wires may be retained by a warp into which the wires are woven, somewhat after the fashion disclosed in U. S. Patent to McBerty, No. 1,104,061. I have also constructed a suitable model cable by rolling thirty spaced wires between a paper ribbon and a strip of masking tape. The spacing was maintained by feeding the thirty wires from thirty separate spools over a comb having grooves at a predetermined pitch, for example, one twenty-fourth of an inch, and between pressure rollers. The paper ribbon was fed into the rollers below the wires, and the masking tape above the wires. In commercial practice, the cable would preferably be made by extrusion of a suitable plastic binder and insulating material or by other mass production methods, such as by printing parallel lines in conducting ink. The individual wires 2 may suitably be bare tinned copper. The cable can then be skinned by a wire stripper of conventional type, but of greater width than usual to accommodate the entire cable. As an example, a suitable cable for an organ might have thirty wires. These may be laid side by side at any suitable spacing such as one twenty-fourth of an inch, making a ribbon of about one and one-half inches in width. For convenience, the wires may be laid down in six groups of five wires each, with a single blank space between groups of five, which makes it easier to handle and identify the wires. Since the wires are held in the same relative position throughout their length, there is no need for sorting or color coding to help identify them, as in conventional bunched cables. In skinning the cables for connection to the preferred type of multiple connector which will be described below, it is preferable not to make the skinning at the extreme end of the cable, but to leave a short section of the insulating binder to hold the wires in place as shown at 4 in Fig. 2.

Figures 4, 5:
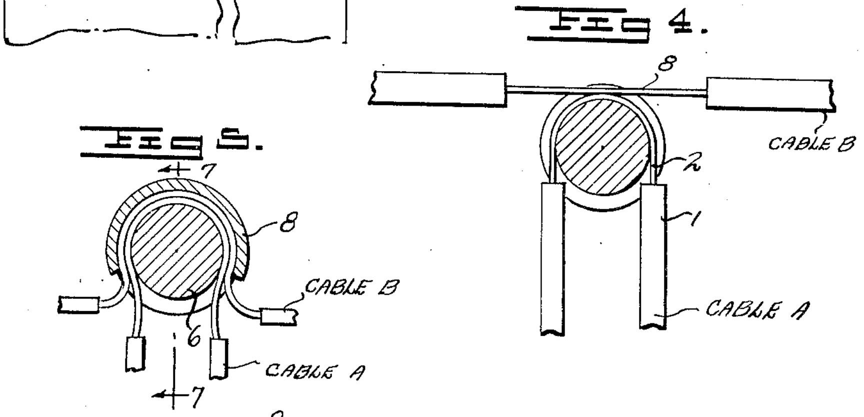
Fig. 4 is a view partly in section and taken at a right angle to Fig. 3, showing the manner of using the insulating spacer of Fig. 3 to form a ganged connector.
Fig. 5 is a view similar to Fig. 4, with fastening means added to form a finished connection.
Figure 6:
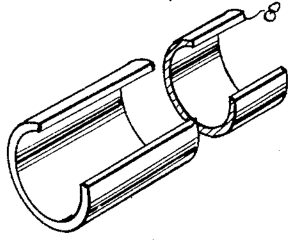
Fig. 6 is a perspective view of the fastening means used in Fig. 5.
Figure 7:
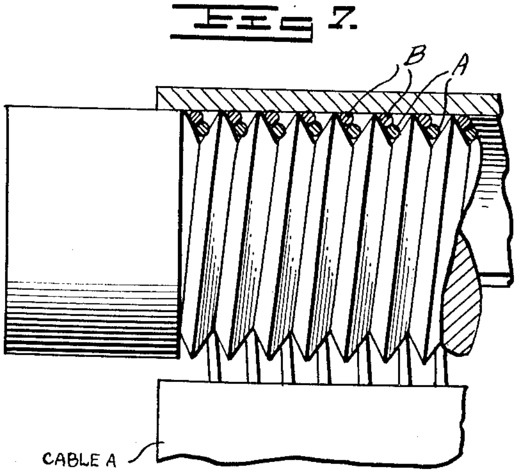
Fig. 7 is a view partly in section taken along line 7—7 of Fig. 5.
Figure 8:
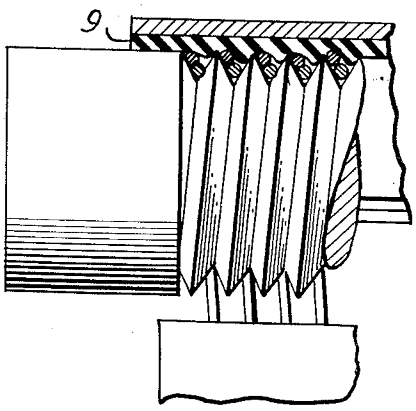
Fig. 8 is a view similar to Fig. 7 but showing the use of a resilient liner.

A simple connector for joining two cables such as described above, or for attaching a cable to multiple circuit components such as resistors, may be made by forming suitable grooves in a nonconducting base, the wires of the cables being laid in the grooves and clamped in place. Such grooves could, of course, be made on the flat surface of a block of insulating material by a suitable multiple grooving tool, but I prefer to use a rod or tube of fiber, plastic, etc., which can be threaded or turned with 60 grooves in the case of an organ, at 24 pitch, of depth approximately twice the diameter of the wire employed, as shown at 6 in Fig. 3. The skinned cable of Fig. 2 may then be laid over the rod 6 so that the wires fall into the respective grooves, one wire of each cable being in each groove. Because the spacing of the grooves is equal to the spacing of the wires in the cable, this operation is quickly done, particularly if a simple jig is used to keep the wires taut and to bend them around the rod. Assuming that another similar cable is to be connected to the cable shown in Fig. 2 at some point intermediate the ends of said other wire, then the latter will be similarly skinned for a short distance at the point where it is desired to connect the two wires, as shown at 8 in Fig. 4. Cable A represents the cable shown in Fig. 2 and cable B represents the second cable which it is desired to connect thereto by contact. Cable B is then laid over rod 6 so that each strand also falls into a separate groove of the rod and contacts the corresponding strand of cable A. If cable B is held taut during this process, it is very simple to insure exact correspondence, particularly if the exactly correct number and spacing of grooves is provided in the rod 6. Cable B is then also wrapped around the rod 6 so that its strands contact the corresponding strands of cable A for somewhat better than half the circumference of each groove. A flexible clamp 8, long enough to cover the entire grooved section of rod 6, is then snapped or slid over the grooved rod to firmly maintain the connection. A very good clamp is made of fiber tube of the same nominal outside diameter as the grooved rod or tube 6. Such a clamp is shown in Fig. 6. It may be split and snapped or slid over the grooved rod. The depth of the grooves should be such that the clamp 8 presses together the individual wires of cable A and cable B in the groove as shown in Fig. 7. Alternatively, a soft elastic packing as shown at 9 in Fig. 8 may be used underneath the clamp, the packing material being sufficiently soft to enter the grooves under the pressure of the clamp 8 and insure good contact of the wires in the groove.

Figure 9:
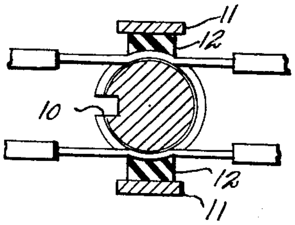
Fig. 9 is a sectional view of another form of connector.
Figure 10:
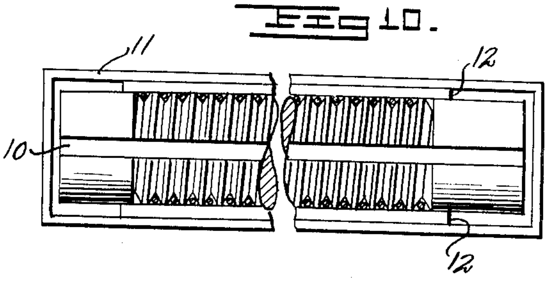
Fig. 10 is a side view of the connector shown in Fig. 9.
Figure 11:
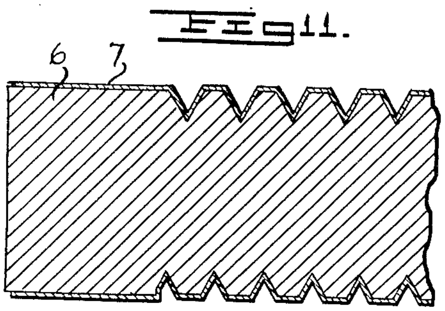
Fig. 11 is a sectional view of a grooved insulating cylinder coated with conductive material.
Figure 12:
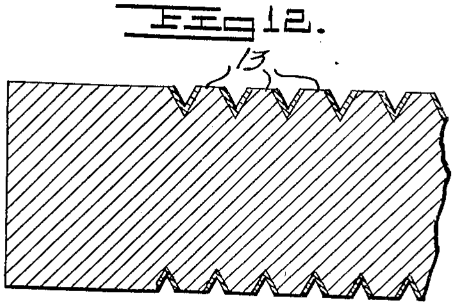
Fig. 12 is a similar view showing the conductive material removed in part to form a series of conductive grooves.
Figure 13:
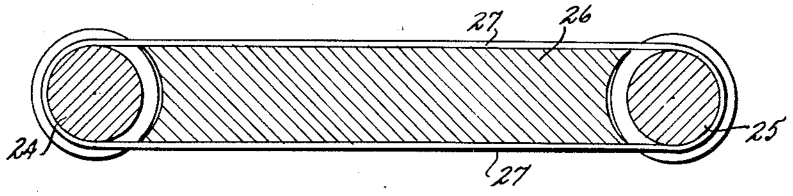
Fig. 13 is a sectional view showing the method of assembling a ganged brush.
Figure 14:
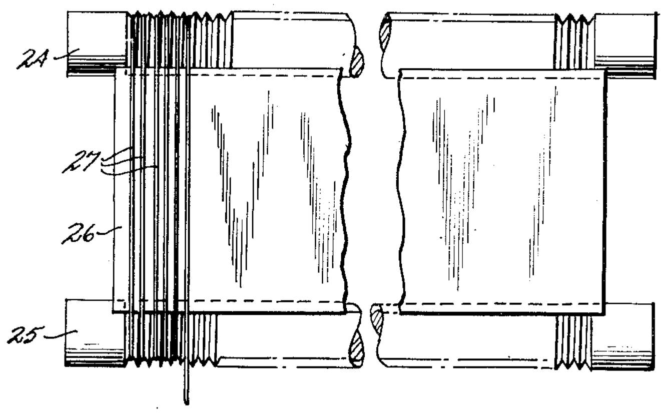
Fig. 14 is a top view of the assembly shown in Fig. 13.

Another form of connector may be made as shown in Figs. 9 and 10. In this case the grooves are made individually conductive which may be done, for example, by painting the entire grooved portion of the rod 6 as shown at 7 in Fig. 11 and then sanding or turning down the top surface of the rod as shown in Fig. 12 to leave flat insulating portions 13 between adjacent turns of the groove. A slot 10 (Fig. 9) is then milled as shown to a depth greater than the bottom of the groove to isolate its adjacent turns. Cables A and B, which are to be connected together are then placed in corresponding grooves at diametrically opposite points as shown in Fig. 9, and a suitable clamp 11 is used to press two strips of resilient insulating material 12, similar in nature to packing material 9 of Fig. 8, as shown in Figs. 9 and 10. The clamp 11 may be made in one piece as shown or obviously may be two separate pieces screwed or otherwise fastened together. Alternatively, of course, the grooves may be formed by a multiple cutting tool as complete circular grooves isolated from both adjacent grooves. This would probably be done in mass production, since it would require less time than turning a screw threaded groove with a single tool. In this case, of course, it would not be necessary to cut a slot 10. Obviously, the paint could also be applied to only a little more than half the circumference of the rod, which could easily be done by painting or spraying the rod from one side only. In this case, too, it would be necessary to cut groove 10 even with the spiral construction.

Ganged resistors may be constructed very much as the ganged connectors are. An insulating rod or tube is grooved by turning or threading, or by cutting parallel circular grooves therein. It is then painted with resistance paint over the entire surface. Very good uniformity over each groove may be obtained by painting, dipping or spraying while the rod is rotated in a lathe. The rod is now ground, turned or sanded to remove the resistive material between the grooves as was done with the connectors. Connection to cables can be made by clamping, according to the schemes shown above. Again, if the rod is threaded, the grooves must be isolated by slitting the rod down one side. Where the device is to be used as a variable resistor, only a portion of each groove will ordinarily contain resistance paint. This is the portion 15 which contacts brush 16 connected to cable 17 in Fig. 17. Another portion of the groove must be highly conductive, this being indicated at 18 in Fig. 17, being normally contacted by brush 16. The electrical equivalent of this arrangement is shown in Fig. 17*a*, each groove comprising a resistor corresponding to elements 15*a* and 18*a* in Fig. 17*a*, these elements being moved longitudinally as a whole with respect to brushes 19*a* and 16*a*, as indicated by arrows L and R in Fig. 17*a* to vary the resistance, as will be obvious from inspection of Fig. 17*a*. The highly conductive portion of the groove may be obtained by painting with conductive paint or by electroplating, or by any other known technique for securing a good conducting region which serves in effect as a slip ring in cooperation with brush 19 of Fig. 17. It will be apparent that as rod 21 is rotated by any suitable means, schematically indicated as crank arm 22, the resistance between brushes 16 and 19 will vary. It will be understood, of course, that rod 21 actually contains a number of grooves corresponding to the number of circuits employed, and that the resistance of all these circuits is varied together as crank arm 22 is operated to rotate rod 21 about its axis. It should be understood, of course, that rod 21 is suitably supported in a bracket having bearing means as schematically indicated at 23 so that the rod may be rotated. In the interest of clarity, and because supporting means will be obvious to any mechanic, they are omitted from the drawing. It will also be apparent that the rotatable ganged resistor of Fig. 17 could be developed as a flat resistor by cutting a number of parallel grooves on the surface of a flat block which could then be slid in a direction parallel to the grooves to produce the desired variation in resistance. Ordinarily, however, the rotatable form is more desirable because of its simplicity of construction and because the problem of friction is minimized with a rotatable member.

The rheostat shown in Fig. 17 requires brushes 16 and 19. These may also be made as a ganged brush by the following method. Referring to Figs. 13–16, two threaded or grooved rods 24 and 25 are held in a temporary spacer or jig 26 about an inch apart. The jig is preferably mounted in a threading lathe or in another suitable device which permits it to be located about a central axis. A spring wire 27 of non-corrosive type, such as brass, is then wrapped continuously about the two rods and the spacer, so that there is one turn of wire for each groove. If a lathe is used, it may be set to feed at the groove pitch so that the wire is readily laid down in the grooves of the rods. The unit so made consists of two sets of brushes, each of which will be attached to a cable. The two cables for the two sets of brushes are now skinned as before, laid over the respective rods and clamped by a snap cover 8, as previously shown. Cement may be used to make a permanent assembly. After the covers are in place and cemented, the two sets of brushes can be cut apart. The cables may terminate at the brushes as shown at 28 (Fig. 15), or may continue as shown by cable 29. In some instances, it may be desirable to have two sets of brushes for each cable as shown in Fig. 16, so that two potentiometers or variable resistors may be connected to one cable. In this case, the spacer may be made somewhat larger than before, and the spring wires cut half-way between the rods.

Figure 15:
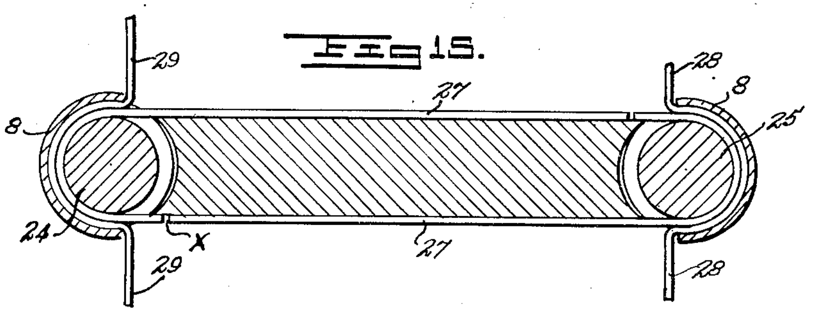
Fig. 15 is a view similar to Fig. 13 showing the fastening covers and cables added to form two complete brushes.
Figure 16:
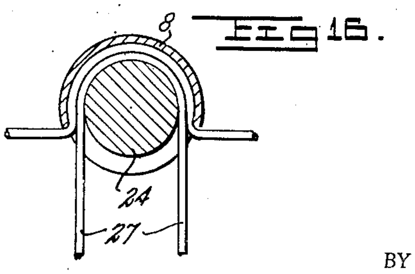
Fig. 16 is a similar view showing how a double brush is produced.

Otherwise, the spring wire would be cut on each side near one of the rods as shown in Fig. 15 at X, so that the full distance between the rods would be available as the wire brush length for each brush. Obviously, many variations of this idea are possible. For example, it is apparent that ganged switches may be made in a similar way, using only conductive paint with definite non-conductive portions of each groove for the open circuited condition of the switch.

Figs. 17 and 18 show a typical assembly of brushes and resistor elements to make up a complete ganged resistor. In this case, to illustrate in another possible variation, the snap covers 8 are omitted from the brushes. Instead, the spring wires 16 and 19 are wound about rods 31 and 32 as illustrated above, and cables 14 and 17 respectively are connected to the brush assembly by the use of strips of cement 37 applied as shown in Fig. 17. Due to the lightness and thinness of the individual strands of the cable, this has been found quite satisfactory for some purposes. Alternatively, the snap covers 8 may be used where this construction is deemed preferable.

Fig. 19 shows how the same principle of construction may be employed in making a potentiometer. The corresponding electrical equivalent is shown in Fig. 20 wherein the element comprising sections 41′, 42′, and 43′ are movable longitudinally, which corresponds to rotation of the grooved rod 44, similar to Figs. 17 and 17*a*. It is obvious that a wide variety of combinations is possible.

Having now shown how the components of my ganged circuit invention may be made, I will illustrate the utility of the system in connection with the construction of an organ which may, for example, be made in accordance with the principles set forth in my copending application, Serial No. 298,669, for "Wave Form Generator," filed July 14, 1952. A typical arrangement for such an organ, used by way of example only, and using conventional circuit elements, is shown in Fig. 21. A complete organ, in the accepted practice and terminology of organ design, consists of a plurality of individual but interconnectable instruments, each instrument being called an organ, with a modifying adjective such as Great Organ, Swell Organ, etc. Each such organ is provided with a manual of keys 51 and a plurality of "stops" or sets of tone generators under the combined control of the keys of the manual and of a set of draw knobs or stop tablets 52—56. As an illustration, consider a Great Organ of sixty keys 51, having a complement of five stops 52—56 as indicated in Fig. 21. Each stop consists then of sixty tone generators which may be pipes, electrical oscillators, variable capacitance generators (as shown in my copending application) or other tone generators. One generator of the stop is assigned to each manual key and is caused to "speak" if its corresponding key is depressed and the stop knob is drawn.

For definiteness, I may name the stops in the example, viol, tuba, diapason, flute and clarinet, these being terms commonly applied to identify the tonal qualities of the stops. If, for example, the viol, tuba and flute stops or draw knobs 52—55 are placed in the activated positions (pressed down), then depressing the middle C key of the great manual causes the three tone generators having viol, tuba and flute qualities at a pitch of middle C to sound or speak.

There is a multiplicity of possible circuit arrangements, any one of which will control the tone generator as required. Of these the one described has been employed in the construction of an organ using variable capacitance generators, as shown in my previously referred to copending application. Such a tone generator speaks when an electrical potential is applied to it. Since one of the objectives of the electrostatic or variable capacitance organ is to provide a pleasing "attack" or variation in sound intensity, the potential applied to the generator is modulated or caused to rise and fall smoothly rather than discontinuously, by combination of condensers and resistors. For example, an activating potential may be applied by a key 51 through a resistor and a condenser (one side of which is grounded) as shown at 57 in Fig. 21. By varying the amount of resistance, the attack may be varied or adjusted as desired.

The conductor leading from each key to the generators must be put into electrical connection or disconnection with any combination of generators assigned to it, at the discretion of the organist. Thus, if there are five stops as in the example, there will be five operable contacts 52'—56' associated with each key circuit, as shown in Fig. 21, so that the biasing potential may be applied at will to any combination of the five tone generators associated with each key. The complete circuit for three exemplary keys is shown in Fig. 21. As a precaution against stray charges on the tone generators that are not speaking, back contacts 58 are provided to ground all leads not in use. As a further control, it may be desirable to vary the output or volume provided by each stop individually. For this purpose, I show additional potentiometers at 59 in Fig. 21 whereby the relative output of each stop may be adjusted by moving the correspondingly marked control of the group of potentiometers 59. It will be apparent that when this is duplicated for sixty keys, to take a typical example, a very large number of circuit elements and of separate wires is required using conventional construction as shown in Fig. 21. In contrast thereto, as shown in Fig. 22, a great simplification is effected by the use of my invention. In order to facilitate comparison, comparable portions of the circuit are shown in Figs. 21 and 22 in dash-line boxes. For example, the resistances 57 and associated condensers are shown in box R in Fig. 21 and the corresponding ganged resistance device is shown in box R' in Fig. 22. This is made up in accordance with a construction previously described in Figs. 17 and 18, except that the cover clamps 8 are shown by way of example only instead of the cemented construction described in Fig. 17.

Box S of Fig. 21 contains all of the switches necessary for the operation of the various organ stops previously described, while box S' of Fig. 22 shows the corresponding ganged construction. The ganged cable 69 from brushes 68 is held taut and uniformly spaced by terminal clamping rod 70 provided with cover clamp 8, or it may be cemented onto member 70. A series of similar grooved rods 73 is used to separate and space the individual wires of cable 69. Rotatable switch members 71, 72, 74 represent the viol, tuba and diapason stops respectively, it being apparent that there would be one of these for each stop used in the organ. The viol stop 71 is shown in its connected position, as is the diapason stop 74. Arcs 71*a*, 72*a* and 74*a*, respectively, show stripes of conducting material which have been painted or otherwise deposited along the entire length of this sector of the surface of rotatable members 71, 72 and 74. This strip 74 is then sanded down as previously described to provide sixty individually insulated conducting segments. Thus, in the position shown, each wire of the stationary brush 75 is connected through a single groove of rotatable element 71 to a corresponding wire of cable 69. A similar but smaller conductive strip 71*b* is also painted along the entire cylindrical surface of member 71, and is grounded, which may be done in any obvious fashion, one preferred way being to provide an extra groove at the end of each rod 71—74 with a grounded brush, the extra groove being electrically connected only to continuous conductive stripe 71*b*.

Box P' of Fig. 22 shows the potentiometer section, corresponding to box P of Fig. 21, and consists of one gang potentiometer for each stop, the construction of each potentiometer being as shown in Fig. 19.

It will be apparent from the above example that a great saving in both labor and material is effected by the use of my invention. It will also be clear that multiple electric circuitry according to the invention is very much more compact and takes up much less space than does less conventional practice.

It will be apparent that the embodiments shown are only exemplary and that various modifications can be made in construction and arrangement within the scope of my invention as defined in the appended claims.

I claim:

1. Ganged electric multiple circuit construction comprising a ganged insulated flat cable having a plurality of spaced parallel conductors, a portion of said cable being stripped to expose the parallel conductors; an insulator having a plurality of grooves in the surface thereof, said grooves being spaced to correspond to the spacing of the exposed conductors, there being one said conductor in a groove; and means for retaining said conductors in said grooves.

2. The invention recited in claim 1, and a second similar ganged cable having at least some of its conductors spaced to correspond with some of the conductors of the first cable and being similarly stripped; the exposed conductors of said stripped portion lying in said grooves in contact with the corresponding conductors of said first cable.

3. The invention recited in claim 2, said insulator being cylindrical and said grooves being formed in the surface of the cylinder substantially at right angles to the axis thereof.

4. The invention recited in claim 3, said retaining means comprising a tubular insulating member axially split from end to end; its inner surface conforming to the outer surface of said insulator and its circumferential extent being greater than one-half the circumferential extent of said insulator.

5. A ganged electrical connection comprising an insulating member having a surface; a series of spaced parallel grooves formed in its surface; conductive material on the surface of each groove; at least two flat ganged insulated cables each having a plurality of parallel wires spaced from each other in correspondence with the spacing of said grooves, exposed portions of said cables lying in said grooves with one exposed wire of each cable in contact with a different portion of its groove from the corresponding exposed wire of the other cable; and a layer of conductive material in each groove electrically conducting said two corresponding wires.

6. The invention recited in claim 5, and means for retaining said wires in said grooves.

7. A spacer and connector element for ganged electrical circuitry comprising an insulating member having a surface; a series of parallel grooves in said surface; and a thin continuous layer of electrically conductive material coating at least part of the exposed surface of each groove, the conductive layers in the respective grooves being insulated from each other.

8. The invention recited in claim 7, said insulating member being cylindrical and said grooves being substantially at right angles to the cylindrical axis.

9. The invention according to claim 7, and a gang brush comprising a series of resilient parallel wires spaced in correspondence with the spacing of said grooves, insulated from each other and lying in a common surface; said wires being supported at one end by a common insulating member and being free at the other end, the free end of said wires being in contact with the conductive layers in said respective grooves.

10. The invention recited in claim 9 and means for producing relative motion between said wires and said grooves.

11. The invention recited in claim 9, said first insulating member being a cylinder and said grooves being substantially at right angles to the cylinder axis, and means for rotating said cylinder relative to said brushes.

12. A gang brush for multiple circuits comprising a cylindrical member having a series of spaced parallel grooves along its length; a short conductive wire fastened in each groove, said wires being insulated from each other by said cylindrical member, said wires extending out a definite distance from said cylinder in a common surface.

13. A resistor comprising an insulating member having a surface, a groove in said surface, a thin layer of electrical resistance material in said groove extending along the length thereof, a brush comprising a resilient wire member having one end supported and a portion thereof near the other end lying in said groove in substantially point contact with the layer of resistant material therein, and means for producing relative motion between said insulating member and said brush.

14. A gang resistor comprising an insulating member, a series of spaced parallel grooves in the surface of said member; a thin layer of electrically conductive material on the exposed surfaces of each groove extending along the length thereof, said conductive material being highly conductive along part of the groove extent and less conductive along a contiguous part of the groove extent to form an electric resistance strip in part of said groove; at least two gang brushes each comprising a number of parallel resilient wires spaced to correspond to the groove spacing, said wires of each brush being fastened at one end to an insulating support and free at the other end, the free ends of said brushes lying at least partly in said grooves, said brushes contacting respectively different parts of the series of grooves so that each groove has at least one brush in contact with the resistive portion thereof and a brush in contact with the conductive portion thereof, and means for producing relative motion between the brushes and the grooves.

15. Gang potentiometer construction comprising a cylindrical insulating member having a series of parallel curved grooves spaced along its length; a thin layer of conducting material on the exposed surfaces of each groove, extending along the length thereof, said conductive material being less conductive in the middle one-third of each groove than in the other two-thirds to provide a resistive portion; three resilient brushes lying in each groove in substantially point contact with the conductive material therein, adjacent brushes being spaced to contact said material at points spaced one-third the length of the conductive portion of each groove, and means for producing relative motion between said insulating member and said brushes.

16. The method of making gang brushes which comprises producing a series of parallel curved grooves along the length of two members each having substantially cylindrical surface of insulating material, spacing said two members a fixed distance apart and parallel to each other, tightly winding around said fixed members a flexible resilient conducting wire so that the successive turns of said wire lie parallel to the adjacent turns thereof and fall into the successive grooves of said cylindrical surfaces, fastening said wires to said cylinders in the region of contact, and cutting said wires between said cylinders.

17. The invention recited in claim 16, wherein the winding step is performed by rotating said assembly of spaced cylinders about a common axis while feeding the wire thereto.

18. Gang conductor construction comprising a member having a substantially cylindrical surface of insulating material, a helical groove in said insulating surface providing a number of parallel grooved turns; a layer of conductive material in said helical groove; and an axial cut along the length of said cylindrical surface to a greater depth than the bottom of the helical groove, whereby the conductive material of each turn is insulated from the adjacent turns.

19. The method of making a gang conductor element which comprises the steps of forming a helical groove in a cylindrical insulating surface, coating said grooved surface with a layer of conductive paint, removing said paint from the cylindrical surface and leaving it in said groove, and cutting said cylindrical surface axially to a greater depth than said helical groove so as to insulate each turn of the groove from other turns.

GEORGE R. STIBITZ.

No references cited.